United States Patent [19]
Williamson et al.

[11] 4,416,159
[45] Nov. 22, 1983

[54] VORTEX FLOWMETER

[75] Inventors: Roger J. Williamson, Harlow; David N. Batchelder, London, both of England

[73] Assignee: ITT Industries, Inc., New York, N.Y.

[21] Appl. No.: 312,494

[22] Filed: Oct. 19, 1981

[30] Foreign Application Priority Data

Nov. 27, 1980 [GB] United Kingdom ............... 8038032

[51] Int. Cl.³ .............................................. G01F 1/32
[52] U.S. Cl. ................................................ 73/861.22
[58] Field of Search ............ 73/861.22, 861.23, 861.24

[56] References Cited

U.S. PATENT DOCUMENTS

| | | | |
|---|---|---|---|
| 2,813,424 | 11/1957 | Liepmann et al. | 73/861.24 |
| 3,940,986 | 3/1976 | Yamasani et al. | 73/861.23 |
| 4,241,612 | 12/1980 | Williamson | 73/861.22 |

*Primary Examiner*—Herbert Goldstein
*Attorney, Agent, or Firm*—T. E. Kristofferson; A. D. Stolzy

[57] ABSTRACT

A bluff body is placed in a fluid pipe with one flat face facing the oncoming fluid. Vortices are then generated and shed alternately from opposite edges of the body. This body is of a scalene triangle cross section, and in one version a hole extends transversely therethrough. A longitudinal hole intersects the first hole at right angles thereto. The vortices cause oscillations in the transverse hole. A light beam is provided in the longitudinal hole. The light beam is modulated as it crosses the path of the transverse hole. Hence by measuring the frequency at which the beam is modulated and by suitable calibration, one gets a good and reliable indication of fluid flow rate. In a second version the transverse hole is formed into a blind hole at the foot of which is an etalon (a Fabry-Perot interferometer). The effect of the fluid oscillations due to vortex generation influences the etalon so that its output is a measure of the fluid flow rate.

1 Claim, 4 Drawing Figures

VORTEX FLOWMETER

This invention relates to flowmeters, and more particularly to a vortex shedding flowmeter.

PRIOR ART STATEMENT

Prior art vortex flowmeters depend upon the use of a bluff body located in a pipe through which fluid flows. Vortices are then generated and are shed from the edges of the bluff body. The rate at which such vortices are generated is dependent upon the fluid flow rate.

SUMMARY OF THE INVENTION

According to the present invention there is provided a vortex shedding flowmeter for measuring the velocity of flow of a fluid in a pipe. The flowmeter includes a bluff body located in the pipe so that fluid flow therein produces vortices which are shed from the bluff body at a rate dependent upon the fluid flow speed. The vortices produced by the fluid flow are shed alternatively from opposite edges of the bluff body. A hole extends into the bluff body whose axis is substantially at right angles to the direction of fluid flow. As a consequence the vortices cause pressure oscillations to take place in the hole. A light source faces a light detector across said hole so that a light beam traverses the hole in a direction at right angles to the axis of the hole. The light beam is then modulated in accordance with the frequency of the oscillations in the hole. Measuring means is then provided responsive to the modulation of the light beam to give an output reading which is a function of the fluid flow rate.

BRIEF DESCRIPTION OF THE DRAWINGS

In the accompanying drawings which illustrate exemplary embodiments of the invention.

DESCRIPTION OF THE PREFERRED EMBODIMENTS

The two arrangements described herein respond to the vortices using optical techniques, and they depend on the fact that fluids as they flow along a pipe or the like contain suspended particles, bubbles or droplets, which are carried along the fluid under flow conditions. Thus a light sensitive detector illuminated by a light beam transverse to the flow is partially obscured by these objects, provided that their refractive indices are unequal to the refractive index of the fluid.

Figure 1:
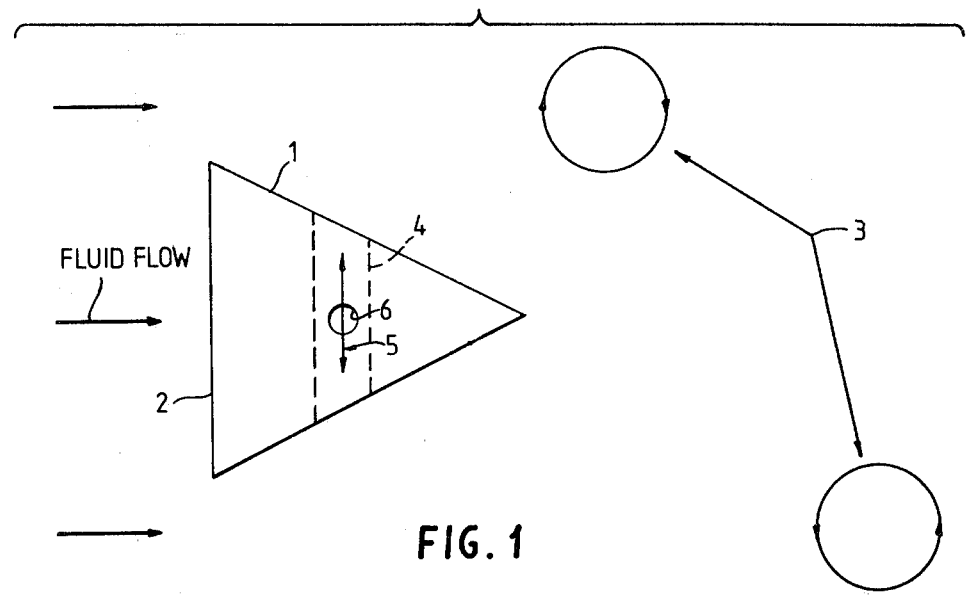
FIG. 1 is a diagrammatic view of a first embodiment of the present invention, i.e. a side view thereof.

In the arrangement shown in FIG. 1, a bluff body 1 has the cross section of a scalene triangle with one flat face 2 so placed that the fluid is at right angles to that flat face 2. When the fluid flows, the bluff body 1 sheds vortices alternately from its top and bottom edges as viewed in FIG. 1 at a frequency which is dependent upon the velocity of the fluid. Two of these vortices are indicated at 3. Thus pressure differentials occur between the other two surfaces of the bluff body 1, and these differentials cause fluid to flow back and forth in a hole 4 interconnecting those other two surfaces. This fluid oscillation is indicated by the double-headed arrow 5.

Figure 2:
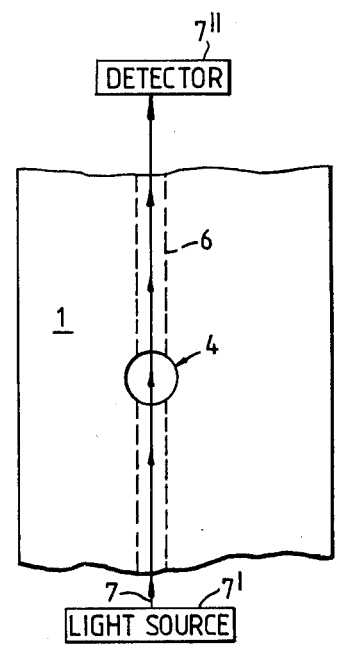
FIG. 2 is a top view of a bluff body in a fluid flow stream.

FIG. 2, which is at right angles to FIG. 1, shows another hole 6 through the bluff body 1 and intersecting the hole 4 at right angles thereto. A beam of light 7 is projected by a light source 7' through the hole 6, and thus across the hole 4 to a light detector 7''. Due to the fluid oscillation and the presence of the various suspended objects in the fluid, the light beam is variably obscured due to that oscillation. Hence the signal from the light detector is modulated at the vortex shedding frequency, and so a measuring instrument connected thereto will, when suitably calibrated, enable the fluid flow rate to be measured.

Figure 3:
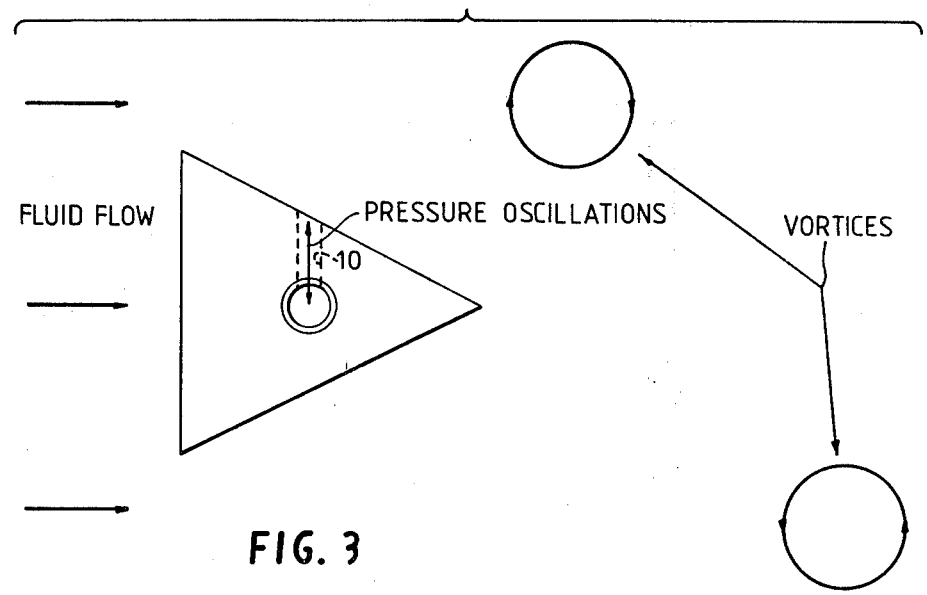
FIG. 3 is a schematic diagram of a second embodiment of the invention.

The arrangement of FIG. 3 is in general similar to that of FIG. 1, except that hole 10 is a blind hole which ends inside the body. Thus the pressure fluctuations which cover at the upper surface of the bluff body are transmitted via this hole 10 to the optical gap between the reflecting surfaces of an elalon 11 (a Fabry-Perot interferometer) located within the bluff body.

These pressure fluctuations cause changes in the refractive index of the fluid in the optical gap of the etalon 11, which, in turn, causes changes in the intensity of a monochromatic light beam 12 passing through the etalon 11. These intensity changes, which are "seen" by a detector 13 are modulated in a manner dependent on the vortex shedding frequency. This, in turn, depends upon the velocity of the fluid. Following calibration, this velocity can be calculated from the vortex shedding frequency. See also FIG. 4.

Figure 4:
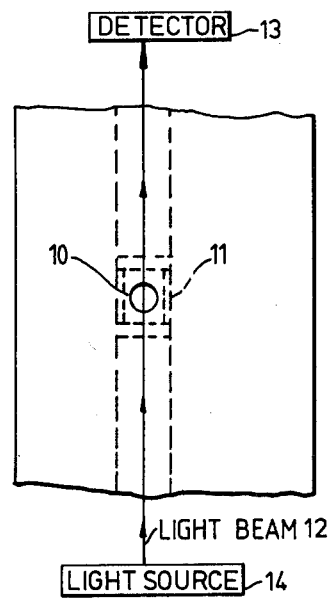
FIG. 4 is a top view of the bluff body in a fluid flow stream.

A light source is again shown at 14 in FIG. 4.

What is claimed is :

1. A vortex shedding flowmeter for measuring the velocity of flow of a fluid in a pipe, said flowmeter comprising: a bluff body located in the pipe so that fluid flow therein products vortices which are shed from the bluff body at a rate dependent on the velocity of the fluid flow, the vortices produced by the fluid flow being shed alternately from opposite edges of a surface of the bluff body which faces the direction from which the said fluid comes, first and second intersecting holes in said bluff body, said first hole extending into said bluff body from one of the surfaces thereof downstream of the first mentioned surface, said hole having an axis substantially at right angles to the direction of fluid flow, a light source, a light detector facing said light source at the ends of said second hole so that a light beam traverses said first hole in a direction at right angles to the axis of said first hole, said light beam being modulated in accordance with the frequency of the oscillations in said first hole, and measuring means responsive to the modulation of said light beam to give an output reading dependent upon the fluid flow rate, wherein said bluff body has as its cross section a scalene triangle with one flat face facing the oncoming fluid and set substantially normal thereto, wherein said first hole is a blind hole extending from another of its faces into the bluff body, and wherein a Fabry-Perot interferometer is located at the inner end of the blind hole, the output of the interferometer giving a signal whose value depends on the fluid flow rate.

* * * * *